United States Patent
Lyu et al.

(10) Patent No.: US 7,016,004 B2
(45) Date of Patent: Mar. 21, 2006

(54) LIQUID CRYSTAL DISPLAY HAVING WIDE VIEWING ANGLE

(75) Inventors: Jae-Jin Lyu, Kyungki-do (KR); Kyeong-Hyeon Kim, Sermgram (KR); Hea-Ri Lee, Seoul (KR); Jian-Min Chen, Suwon (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 10/903,480

(22) Filed: Aug. 2, 2004

(65) Prior Publication Data

US 2005/0062923 A1    Mar. 24, 2005

Related U.S. Application Data

(60) Continuation of application No. 09/877,481, filed on Jun. 8, 2001, now Pat. No. 6,771,344, which is a division of application No. 09/087,408, filed on May 29, 1998, now Pat. No. 6,285,431.

(30) Foreign Application Priority Data

May 29, 1997  (KR)  .................................. 97-21708
Aug. 25, 1997  (KR)  .................................. 97-40665

(51) Int. Cl.
  *G02F 1/1343*  (2006.01)
  *G02F 1/1337*  (2006.01)
(52) U.S. Cl. ........................ 349/143; 349/129; 349/139
(58) Field of Classification Search ................. 349/38, 349/39, 129, 130, 139, 141, 143
See application file for complete search history.

(56) References Cited

U.S. PATENT DOCUMENTS

| | | | |
|---|---|---|---|
| 4,639,087 A * | 1/1987 | Cannella | 349/38 |
| 4,869,576 A | 9/1989 | Aoki et al. | 350/336 |
| 5,136,407 A | 8/1992 | Clerc | 359/55 |
| 5,229,873 A | 7/1993 | Hirose et al. | 359/55 |
| 5,309,264 A | 5/1994 | Lien et al. | 359/87 |
| 5,608,556 A | 3/1997 | Koma | 349/143 |
| 5,615,028 A * | 3/1997 | Ishiguro et al. | 349/42 |
| 5,641,974 A | 6/1997 | den Boer et al. | 257/59 |
| 5,666,179 A | 9/1997 | Koma | 349/143 |
| 5,710,611 A * | 1/1998 | Suzuki et al. | 349/129 |
| 5,724,107 A | 3/1998 | Nishikawa et al. | 349/38 |
| 5,767,926 A | 6/1998 | Kim et al. | 349/38 |
| 5,777,700 A * | 7/1998 | Kaneko et al. | 349/39 |
| 5,781,262 A * | 7/1998 | Suzuki et al. | 349/128 |
| 5,831,704 A | 11/1998 | Yamada et al. | 349/124 |
| 5,953,093 A | 9/1999 | Hirata et al. | 349/143 |
| 5,953,148 A | 9/1999 | Moseley et al. | 359/237 |
| 5,995,176 A | 11/1999 | Sibahara | 349/44 |
| 6,100,953 A | 8/2000 | Kim et al. | 349/129 |
| 6,115,093 A | 9/2000 | Murai et al. | 349/129 |
| 6,327,014 B1 * | 12/2001 | Mulatier et al. | 349/143 |

FOREIGN PATENT DOCUMENTS

| | | |
|---|---|---|
| JP | 05-088150 | 4/1993 |
| JP | 07-064089 | 3/1995 |

* cited by examiner

*Primary Examiner*—Tarifur R. Chowdhury
(74) *Attorney, Agent, or Firm*—Cantor Colburn LLP

(57) ABSTRACT

Apertures are formed in the common electrode or in the pixel electrode of a liquid crystal display to form a fringe field. Storage capacitor electrodes are formed at the position corresponding to the apertures to prevent the light leakage due to the disclination caused by the fringe field. The apertures extend horizontally vertically or obliquely. The apertures in adjacent pixel regions may have different directions to widen the viewing angle.

6 Claims, 18 Drawing Sheets

LIQUID CRYSTAL DISPLAY HAVING WIDE VIEWING ANGLE

CROSS REFERENCE

The present application is a Continuation Application from U.S. patent application Ser. No. 09/877,481 now U.S. Pat. No. 6,771,344 filed Jun. 8, 2001 which is a Divisional Application from U.S. patent application Ser. No. 09/087,408, now U.S. Pat No. 6,285,431 filed May 29, 1998, the disclosure of which is hereby incorporate fully by reference.

BACKGROUND OF THE INVENTION (a) Field of the Invention

The present invention relates to a liquid crystal display having wide viewing angle.

(b) Description of the Related Art

A liquid crystal display (LCD) includes two substrates and a liquid crystal layer interposed therebetween. The transmittance of the light is controlled by the strength of the electric field applied to the liquid crystal layer.

A conventional twisted nematic (TN) liquid crystal display, which is one of the most widely used LCD, has a couple of transparent substrates which have transparent electrodes respectively on their inner surfaces, a liquid crystal layer between two substrates, and a couple of polarizers which are attached to the outer surfaces of the substrates respectively. In off state of the LCD, i.e., in the state that the electric field is not applied to the electrodes, the long axes of the liquid crystal molecules are parallel to the substrates and twisted spirally with a constant pitch from the inner surface of one substrate to that of the other substrate, and thus the orientation of the long axes of the liquid crystal molecules vary continuously.

However, the contrast ratio of the conventional TN LCD in a normally black mode may not be so high because the incident light is not fully blocked in its off state, i.e., in absence of the electric field.

To solve this problem, a vertically aligned twisted nematic (VATN) mode LCD is proposed in the U.S. patent application Ser. No. 3,914,022 and in "Eurodisplay '93", pp. 158–159 by Takahashi.

The VATN in normally black mode may have an off state which is sufficiently dark, because the liquid crystal molecules are aligned perpendicular to the substrates in off state. However the viewing angle of the VATN LCD may not be so wide.

On the other hand, T. Yamamoto et al. disclosed a VATN simple matrix LCD using fringe fields in "SID '91, pp.762–765", and Lien proposed a structure having an aperture in the pixel electrode to solve the problem of low transmittance in on state of a simple matrix multi domain VATN.

However, the structure that Lien proposed may have light leakage generated near the aperture.

SUMMARY OF THE INVENTION

It is therefore an object of the present invention to widen the viewing angle of LCD.

It is another object of the present invention to prevent the disclination of LCD.

These and other objects features and advantages are provided, according to the present invention, by a liquid crystal display comprising a first substrate having a common electrode, a second substrate having a pixel electrode and a storage capacitor electrode. One of the electrodes has an aperture and the storage capacitor electrode is located at the position corresponding to the aperture.

The storage capacitor electrode prevents the light leakage due to a fringe field generated from the aperture.

Between the first and the second substrates, a liquid crystal layer having negative dielectric anisotropy may be interposed. The liquid crystal layer may include chiral nematic liquid crystal or nematic liquid crystal having chiral dopant of 0.01–3.0 wt %.

Two substrates may have alignment layers respectively, to align the molecular axes of the liquid crystal molecules perpendicular to the substrates. The alignment layers may be rubbed or not.

The storage capacitor electrode may be connected to a gate line and the number of the storage capacitor electrode may be more than one.

It is preferable that the width of the aperture is 3–15 $\mu$m and the distance between the apertures is 8–50 $\mu$m.

To obtain the wide viewing angle, the linear apertures in adjacent pixel regions extend in the different directions. For example, if the direction of the aperture of one pixel is parallel to the gate line the aperture of the adjacent pixel is preferably perpendicular to the gate line. As a result, the liquid crystal molecules rotate in 4 directions.

DETAILED DESCRIPTION OF THE PREFERRED EMBODIMENTS

Figure 1A:
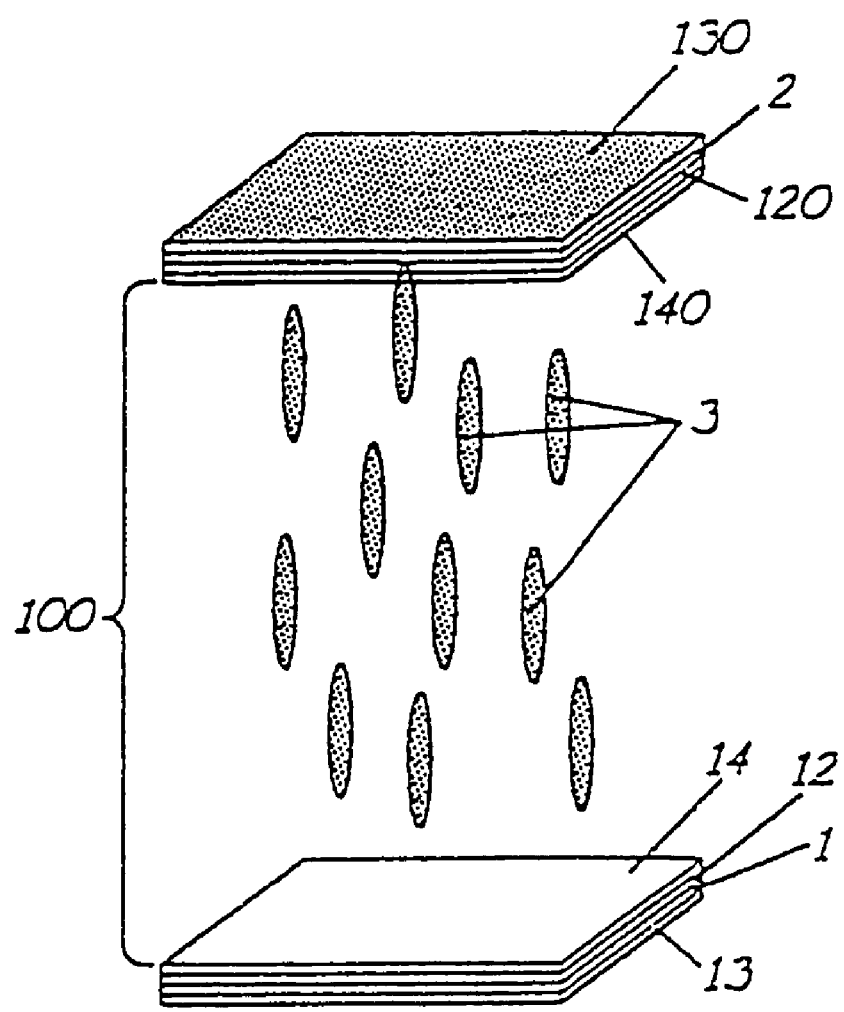
FIGS. 1A and 1B are schematic diagrams of the alignment of liquid crystal molecules of a VATN LCD respectively in black state and white state according to an embodiment of the present invention.

The present invention will now be described more fully hereinafter with reference to the accompanying drawings, in which preferred embodiments of the present invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity.

Figure 1B:
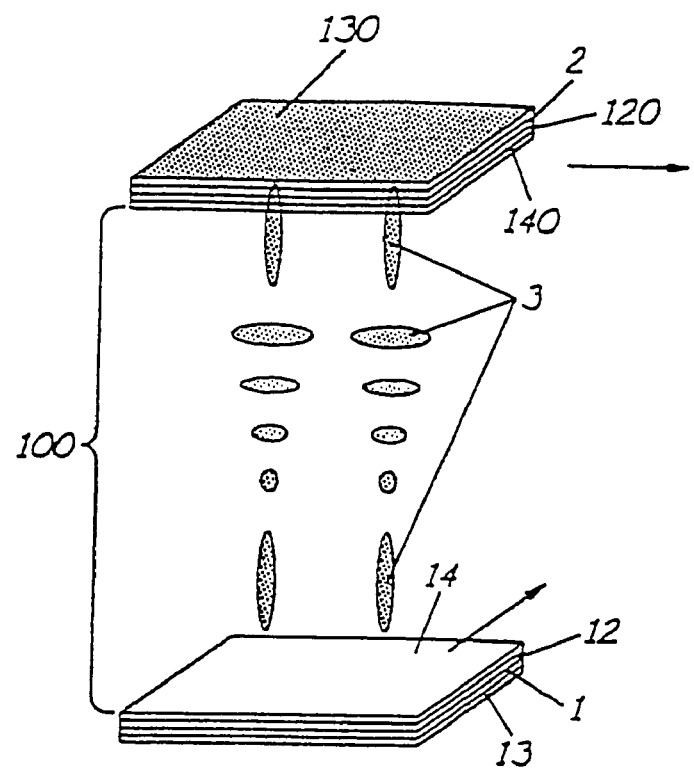
Figure 2:
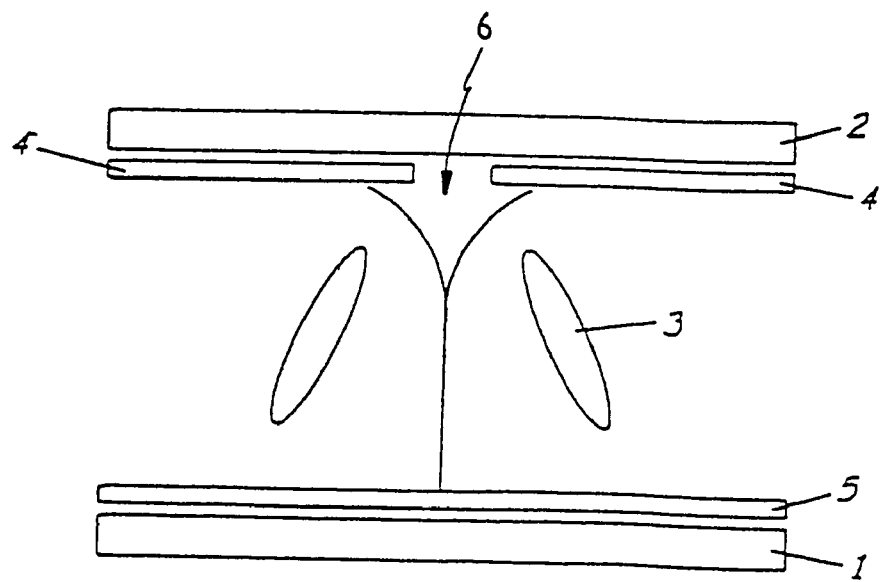
FIG. 2 shows the structure of the electrodes and the alignment of the liquid crystal molecules of a VATN LCD according to an embodiment of the present invention.

FIGS. 1A and 1B are schematic diagrams of the alignment of liquid crystal molecules of a VATN LCD respectively in black state and white state according to an embodiment of the present invention. FIG. 2 shows the structure of the electrodes and the alignment of the liquid crystal molecules of a VATN LCD according to an embodiment of the present invention.

As shown in FIGS. 1A and 1B, two glass substrates 1 and 2 are spaced apart from each other. On the inner surfaces of the substrates 1 and 2 transparent electrodes 12 and 120 made of a transparent conductive material such as ITO (indium tin oxide) or the like are formed respectively, and alignment layers 14 and 140 are formed thereon respectively. Between the substrates 1 and 2 a liquid crystal layer 100 including a chiral nematic liquid crystal having negative dielectric anisotropy or a nematic liquid crystal doped with chiral dopant of 0.01–0.3 wt % is disposed. On the outer surfaces of the substrates 1 and 2 polarizers 13 and 130 are attached. The polarizers 13 and 130 polarize the rays incident on the liquid crystal layer 100 and the rays out of the liquid crystal layer 100 respectively. The polarizing directions of the polarizers 13 and 130 are perpendicular to each other. The alignment layers 14 and 140 may be rubbed or not.

FIG. 1A shows the off state that the electric field is not applied, where the long molecular axes of the liquid crystal molecules 3 in the liquid crystal layer 100 are aligned perpendicular to the surface of the substrates 1 and 2 by the aligning force of the alignment layers 14 and 140.

The polarized light by the polarizer 13 attached to the lower substrate 1 passes through the liquid crystal layer 100 without changing its polarization. Then, the light is blocked by the analyzer 130 attached to the upper substrate 2 to make a black state.

FIG. 1B shows the on state that the sufficient electric field is applied to the liquid crystal layer 100 by the electrode 4 and 5, where the liquid crystal molecules 3 in the liquid crystal layer 100 are twisted spirally by 90° from the lower substrate 1 to the upper substrate 2, and the director of the liquid crystal layer 100 varies continuously. However, near the inner surfaces of two substrates 1, 2, the aligning force of the alignment layers 14, 140 is larger than the force due to the applied electric field, and the liquid crystal molecules stay vertically aligned.

The polarized light by the polarizer 13 passes through the liquid crystal layer 100 and its polarization is rotated by 90° according to the variation of the director of the liquid crystal layer 100. Therefore, the light passes through the analyzer 130 to make a white state.

FIG. 2 shows the structure of the electrodes and the alignment of the liquid crystal molecules of a VATN LCD according to an embodiment of the present invention. An ITO electrode 4 formed on the upper substrate 2 has an aperture 6. In absence of electric field as shown in FIG. 1A, the liquid crystal molecules 3 stay in its vertically aligned state to show the black state. If the electric field applied to the liquid crystal layer by the electrodes 4 and 5, in most regions between the electrodes 4 and 5, the field direction is perpendicular to the substrates 1 and 2. However, near the aperture of the ITO electrode 4, the electric field is not completely perpendicular to the substrate 2. The electric field near the aperture is called the fringe field. The long axes of the liquid crystal molecules tend to be perpendicular to the field direction since the liquid crystal layer have negative dielectric anisotropy. Therefore, the directions of the long axes of the liquid crystal molecules are tilted and twisted near the fringe field.

An LCD according to embodiments of the present invention includes a TFT (thin film transistor) substrate and a common substrate. On the TFT substrate, a plurality of gate lines and data lines crossing each other are formed, and the gate lines and the data lines define pixel region. On the common substrate, a common electrode having apertures and a black matrix which defines pixel regions are formed.

According to the first to the fourth embodiments of the present invention, a storage capacitor electrode is formed at the position corresponding to the aperture to shield the light leakage.

Now, the first embodiment of the present invention will be described with reference to FIGS. 3–5.

Figure 3:
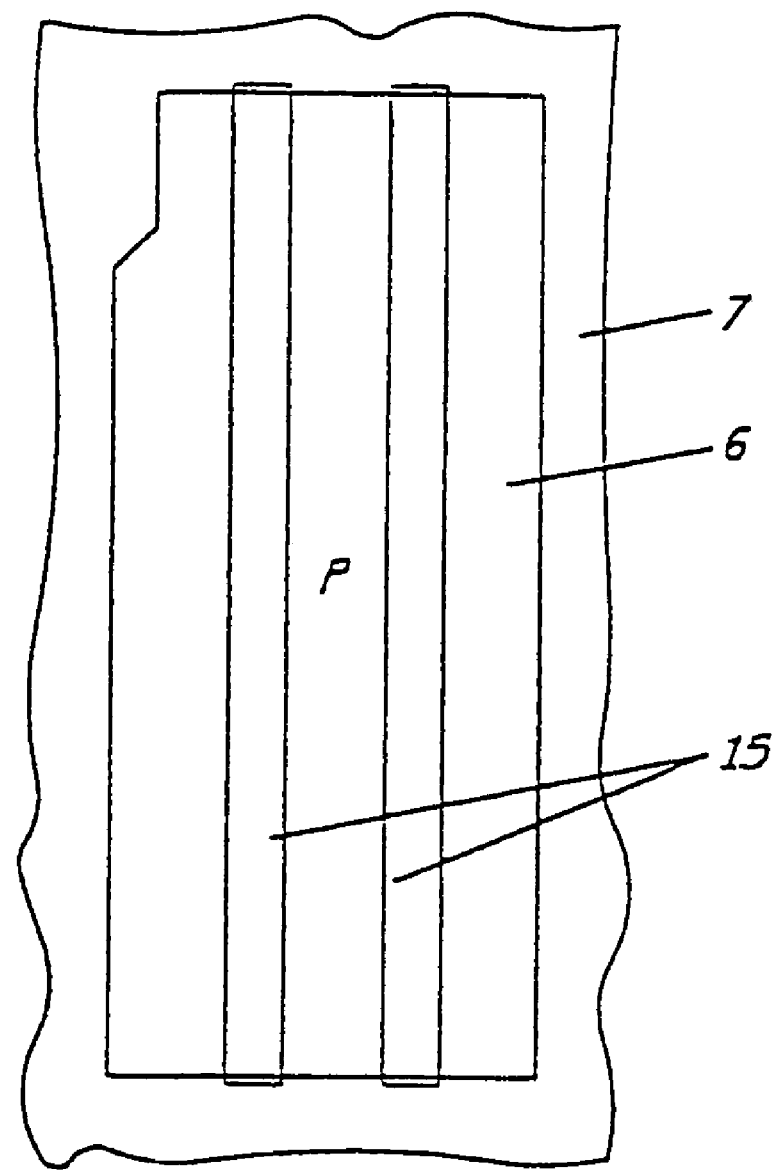
FIG. 3 is a layout view of a common substrate according to the first embodiment of the present invention.

FIG. 3 is a layout view of a common substrate of a liquid crystal display according to the first embodiment of the present invention. FIG. 3 shows a pixel region, where a common electrode has apertures.

As shown in FIG. 3, a black matrix pattern 7 is formed along the boundary of a pixel region P and a common electrode 6 is formed to cover the entire surface of the common substrate. The common electrode 6 has two longitudinally long linear apertures 15 which are spaced apart from and parallel to each other in a pixel region.

It is preferable that the width of the apertures 15 may be 3–15 μm, and the distance between the apertures 15 may be 8–50 μm. The width of 3–12 μm and the distance of 10–30 μm would be better.

Figure 4:
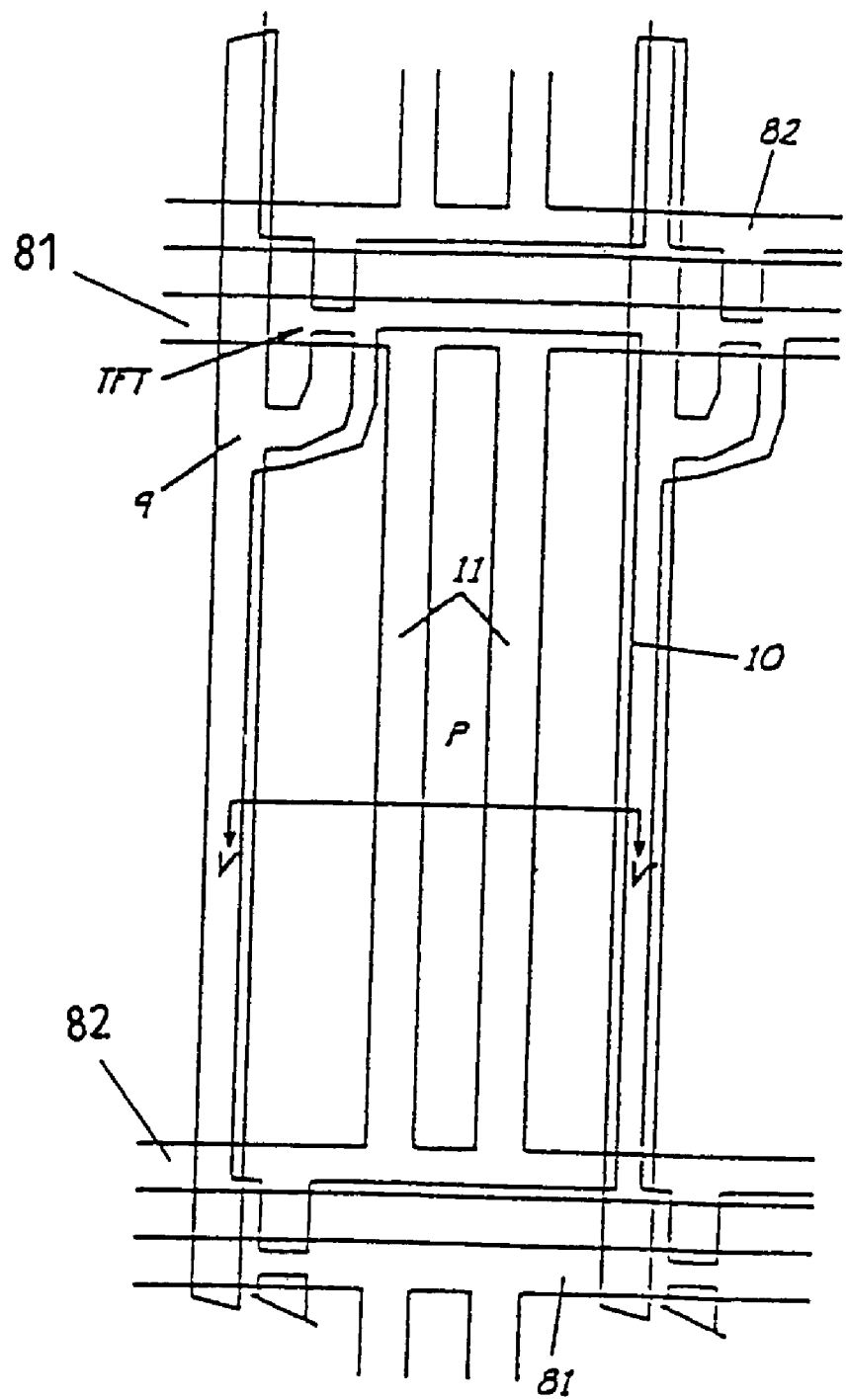
FIG. 4 is a layout view of a TFT (thin film transistor) substrate according to the first embodiment of the present invention.
Figure 5:
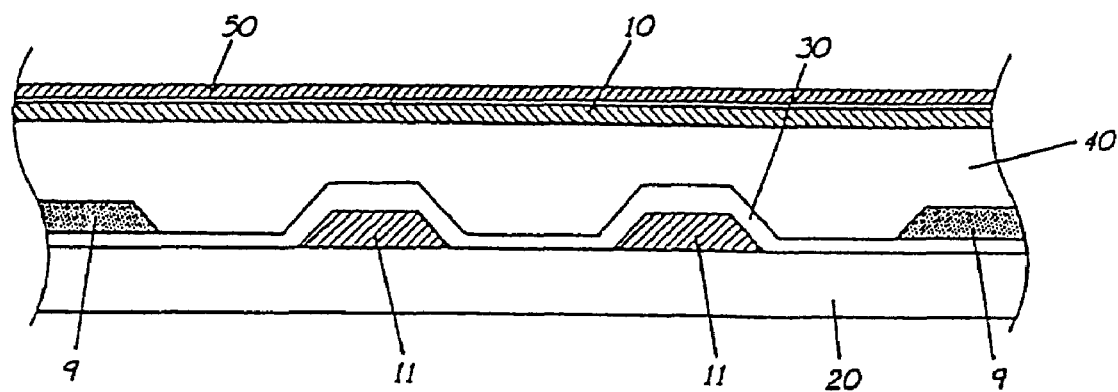
FIG. 5 is a sectional view of a TFT substrate shown in FIG. 4 taken along the line V–V'.

FIG. 4 is a layout view of a TFT substrate according to the first embodiment of the present invention, and FIG. 5 is a sectional view of the TFT substrate taken along the line V–V' of FIG. 4.

As shown in FIGS. 4 and 5, a first and a second gate lines 81 and 82 spaced apart from each other are formed on a transparent glass substrate 20, and extend in the horizontal or transverse direction. Two storage capacitor electrodes 11 which are separated from and parallel to each other connected to both the gate lines 81 and 82 are formed on the substrate 20. The storage capacitor electrodes 11 are longitudinally lay and they are located at the positions corresponding to the apertures 15 in the common electrode 6 on the common substrate.

A gate insulating layer 30 covers the storage capacitor electrodes 11 and the first and the second gate lines 81 and 82. A data line 9 perpendicular to the gate lines 81 and 82 is formed on the gate insulating layer 30. A TFT having a gate electrode which is a portion of the first gate line 81 is formed at a portion near the intersection of the first gate line 81 and the data line 9. A planarized passivation layer 40 is formed thereon, and a pixel electrode 10 overlapping the first and the second gate lines 81 and 82 and the data line 9 is formed on the passivation layer 40. An alignment layer 50 is formed thereon, and the alignment layer 50 may be rubbed or may not.

Although the linear apertures in the common electrode extend longitudinally in this embodiment they may extend horizontally or obliquely.

Figure 6:
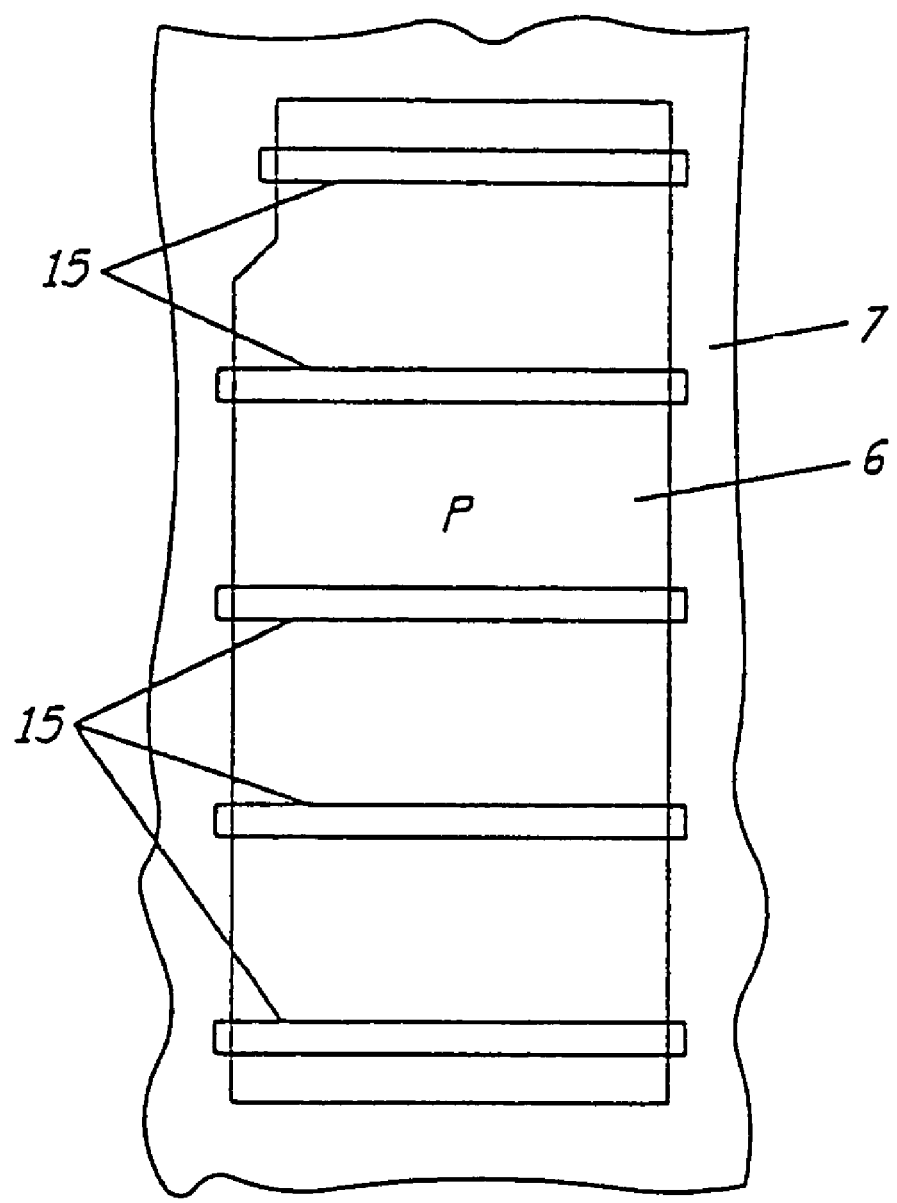
FIG. 6 is a layout view of a common substrate according to the second embodiment of the present invention.
Figure 7:
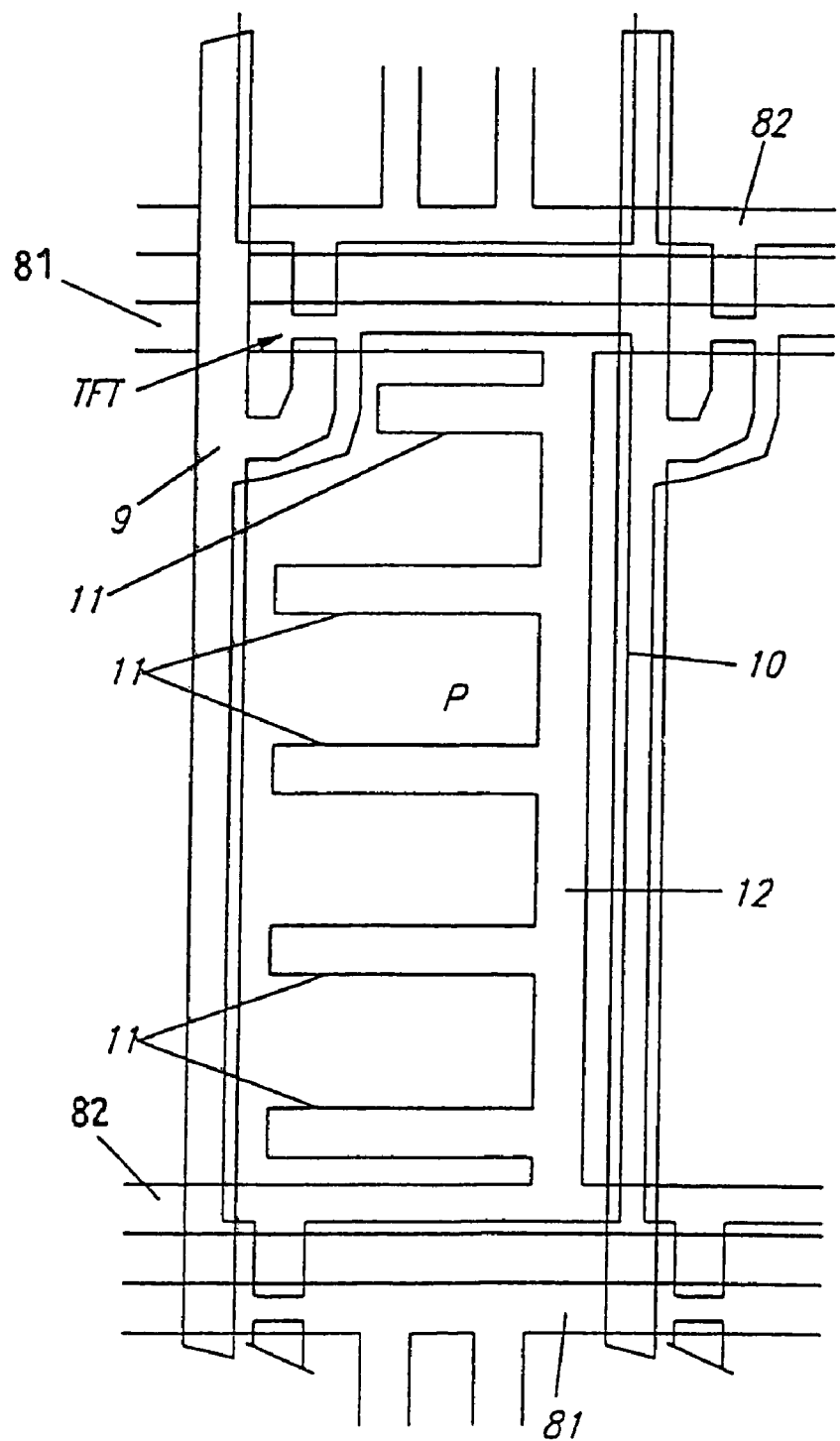
FIG. 7 is a layout view of a TFT substrate according to the second embodiment of the present invention.

FIGS. 6 and 7 are the respective layout views of the common and TFT substrates having horizontal apertures according to the second embodiment.

As shown in FIG. 6, a black matrix pattern 7 is formed along the boundary of a pixel region P, and a common electrode 6 is formed to cover the entire surface of the common substrate. The common electrode 6 has a plurality of horizontally long linear apertures 15 which are spaced apart from and parallel to each other in a pixel region.

The width and the distance of the apertures 15 may be the same as those of the first embodiment.

On the other hand, as shown in FIG. 7, a first and a second gate lines 81 and 82 which are separated from each other and extend horizontally and a branch 12 connecting the gate lines 81 and 82 extending in a vertical direction are formed on a transparent glass substrate 20. A plurality of storage capacitor electrodes 11 which are parallel to each other and to the gate lines 81 and 82 are formed on the substrate and connected to the branch 12. The storage capacitor electrodes 11 are transversely lay, and they are located at the positions corresponding to the apertures 15 in the common electrode 6 on the common substrate.

FIGS. 8–11 are layout views of common and TFT substrates having oblique apertures according to the third and the fourth embodiments. In the third and the fourth embodiment the apertures make an angle of 0°–90° to the data line and the gate line.

Figure 8:
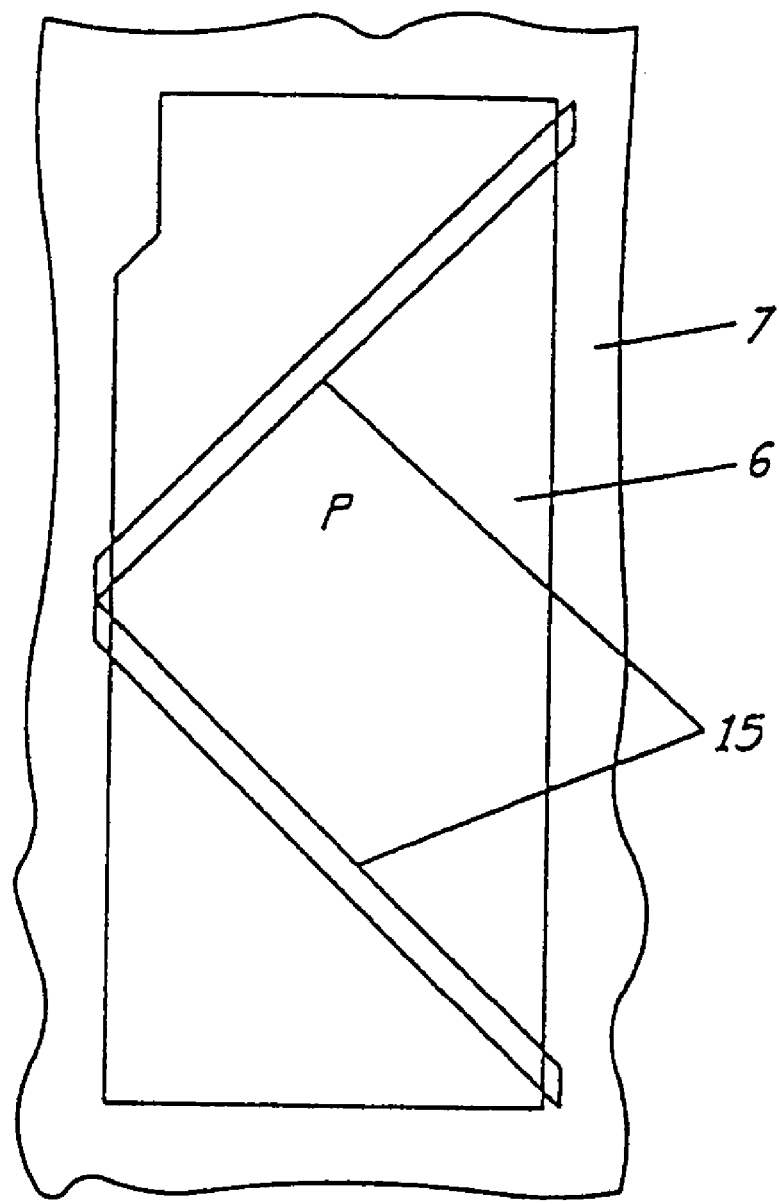
FIG. 8 is a layout view of a common substrate according to the third embodiment of the present invention.
Figure 10:
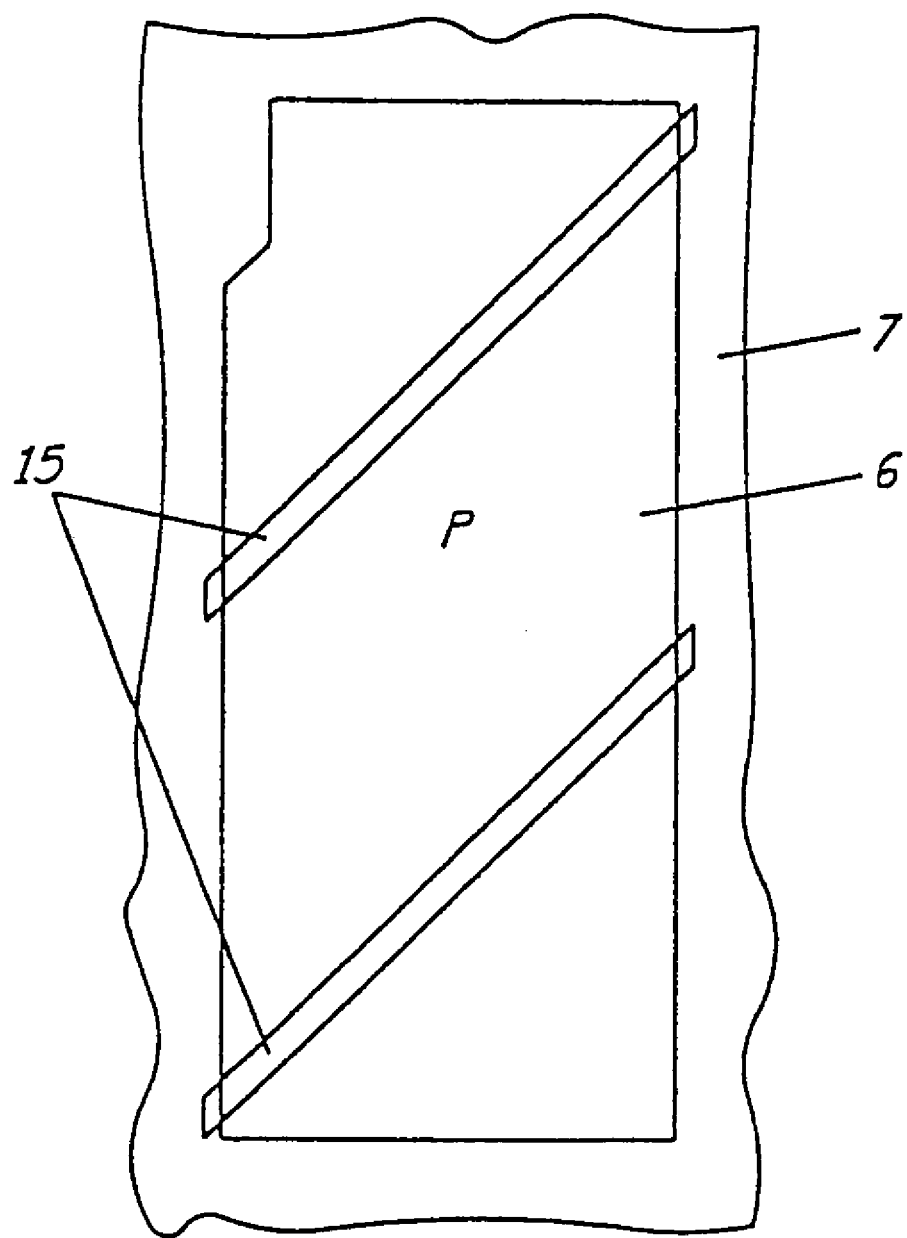
FIG. 10 is a layout view of a common substrate according to the fourth embodiment of the present invention.

As shown in FIGS. 8 and 10, a black matrix pattern 7 is formed along the boundary of a pixel region P, and a common electrodes is formed to cover the entire surface of the common substrate. The common electrode 6 has two obliquely long linear apertures 15 which are spaced apart from each other in a pixel region.

In the third embodiment shown in FIG. 8, each pixel has an aperture extending in the down left direction from the up right edge and an aperture extending in the up left direction from the bottom right edge, and the end of apertures 15 reach the left central edge of the pixel. On the other hand, in the fourth embodiment illustrated in FIG. 10, each pixel has two parallel apertures extending in the up right or the down left direction, The width and the distance of the apertures 15 may be the same as those of the first embodiment.

Figure 9:
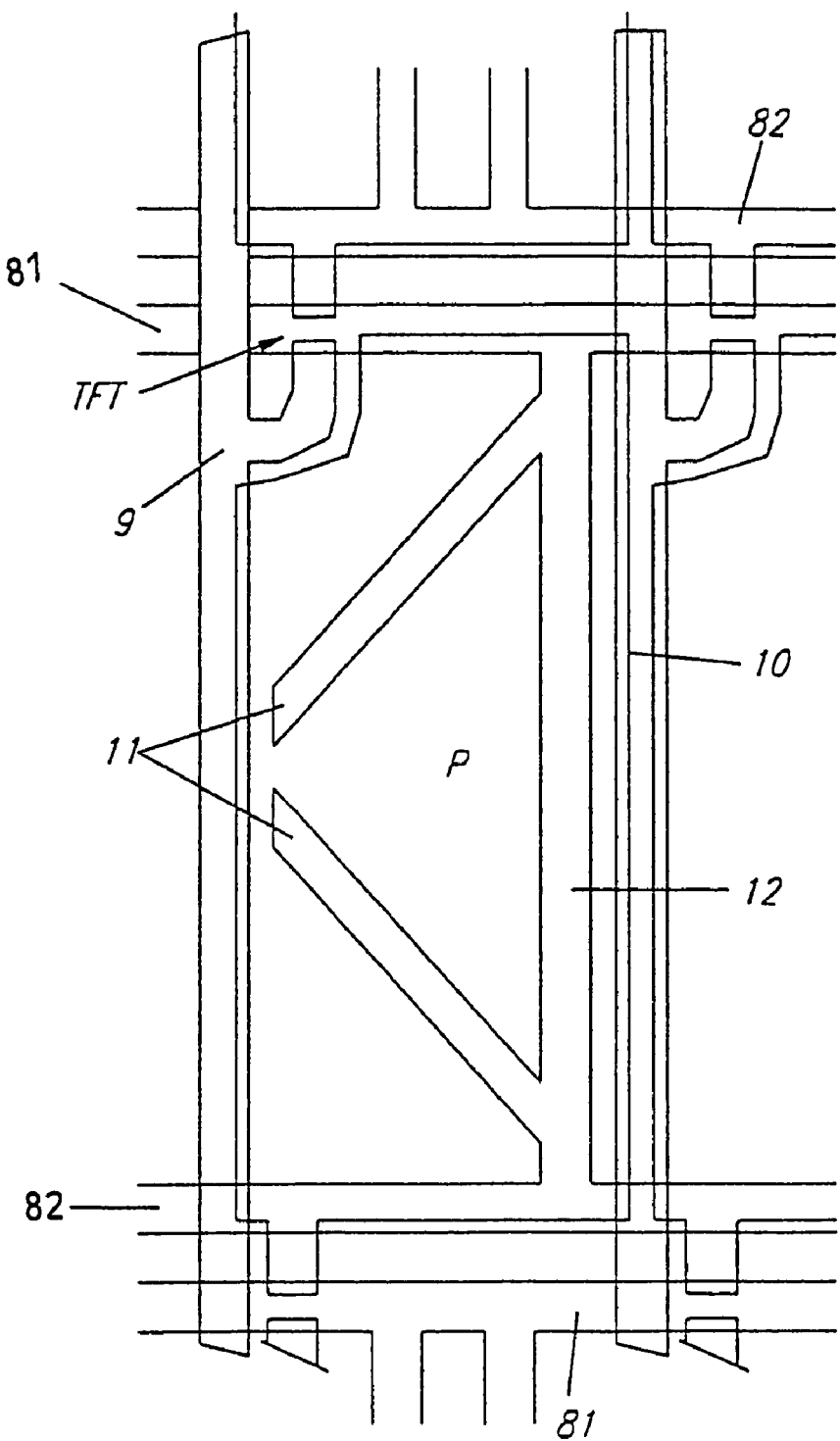
FIG. 9 is a layout view of a TFT substrate according to the third embodiment of the present invention.
Figure 11:
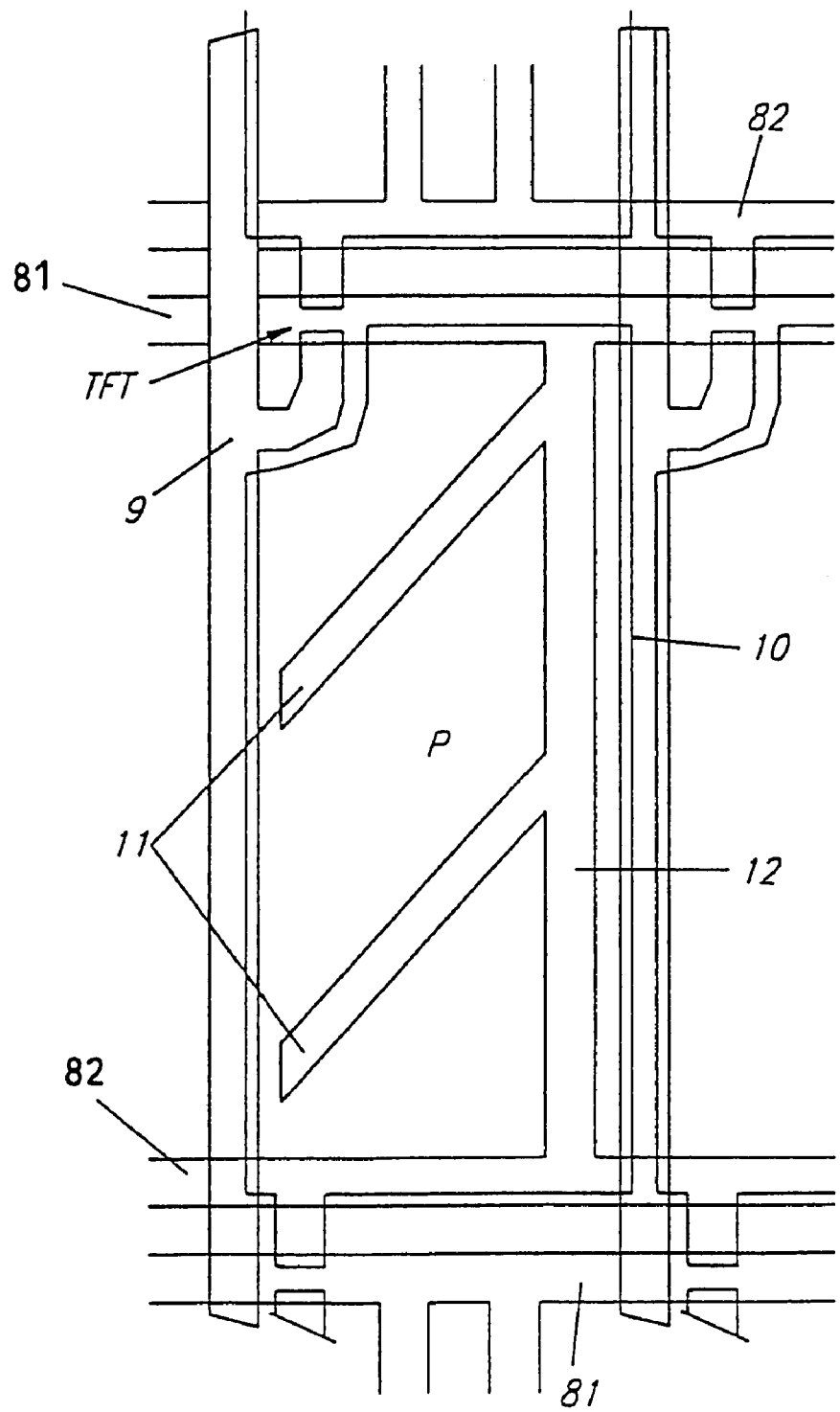
FIG. 11 is a layout view of a TFT substrate according to the fourth embodiment of the present invention.

FIGS. 9 and 11 are the layout views of TFT substrates according to the third and the fourth embodiments of the present invention.

As shown in FIG. 9, a first and a second gate lines 81 and 82 which are separated from each other and extend horizontally and a branch 12 connecting the gate lines 81 and 82 extending in a vertical direction are formed on a transparent glass substrate 20. Two storage capacitor electrodes 11 on the substrate extend obliquely from the gate lines 81 and 82 to the left center of the pixel region P, and are connected to the branch 12.

A TFT substrate illustrated in FIG. 11 has a first and a second gate lines 81 and 82, a branch 12 and a data line 9 having the same shapes as those in the third embodiment shown in FIG. 9. Two storage capacitor electrodes 11 parallel to each other extend obliquely in the up right or the bottom left direction and are connected to the branch 12.

In the third and the fourth embodiments as in the first embodiment, the position of the storage capacitor electrodes 11 are corresponding to the apertures 15 in the common electrode 6 on the common substrate to shield the light leakage due to a fringe field.

In the third and the fourth embodiments of the present invention, the alignment layers formed on the pixel electrode may be rubbed or may not. When the alignment layers are rubbed, the rubbing direction may make an angle of 0°–135° with respect to the direction of the linear aperture.

Next, the fifth embodiment of the present invention will be described. In the fifth embodiment, adjacent pixels have apertures extending different directions to widen the viewing angle.

Figure 12:
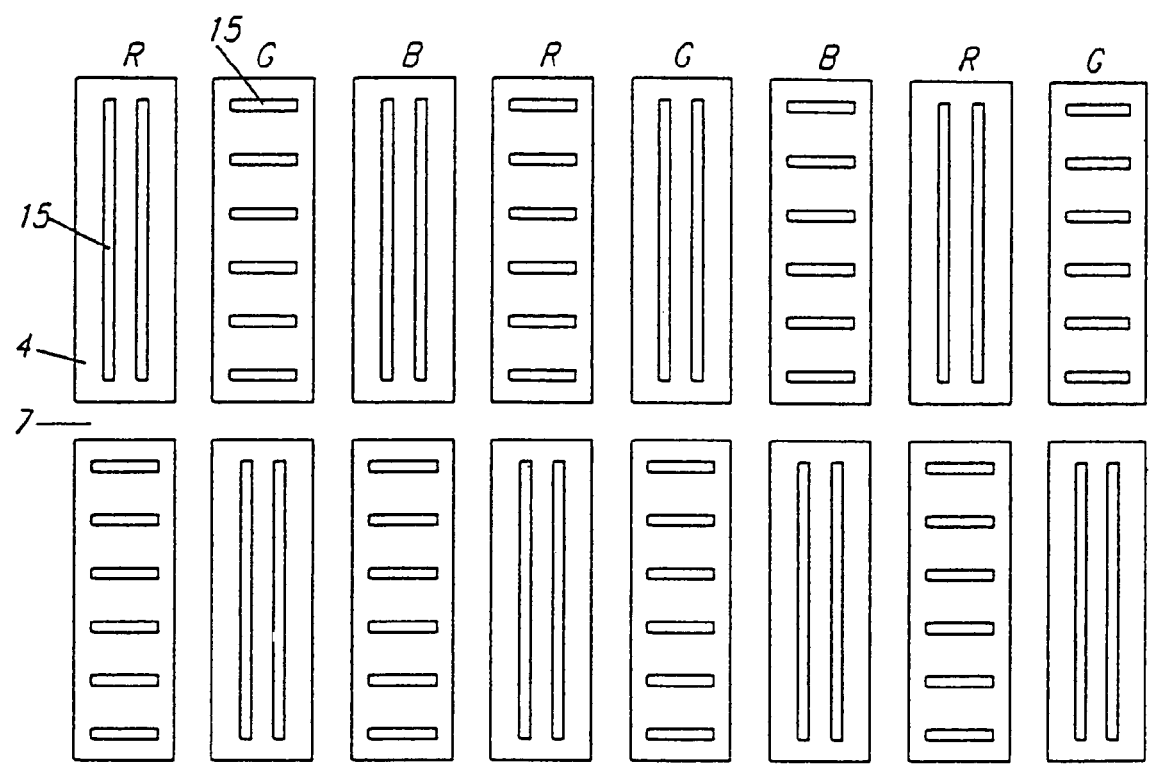
FIG. 12 is a layout view of a substrate according to an embodiment of the present invention.

FIG. 12 is a layout view of a common substrate according to the fifth embodiment.

As shown in FIG. 12, a black matrix pattern 7 is formed and defines a plurality of pixel regions corresponding to the red, green and blue color filters R, G and B. An ITO electrode 4 having a plurality of linear apertures 15 is formed thereon. The extending directions of the linear apertures of adjacent pixel regions are different from each other, i.e., horizontal apertures and vertical apertures are arranged alternately by pixel. For example, a red pixel region has vertical apertures and an green pixel region adjacent to the red pixel region has horizontal apertures.

It is assumed to display red color using this LCD. Then, the blue and the green pixels remain in their OFF state and only the red pixels turn on. If the extending direction of the apertures of a first red pixel is horizontal, and the extending direction of the aperture of a second red pixel adjacent to the first red pixel is vertical.

Now the behaviors of the liquid crystal molecules are described with reference to FIGS. 13A and 13B in this case.

Figure 13A:
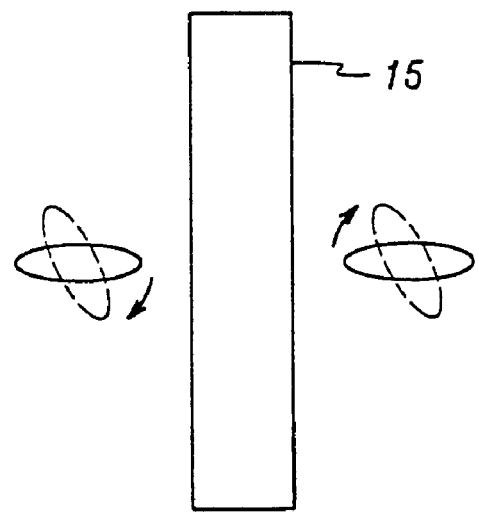
FIGS. 13A and 13B show rotated directions of the liquid crystal molecules near the apertures.
Figure 13B:
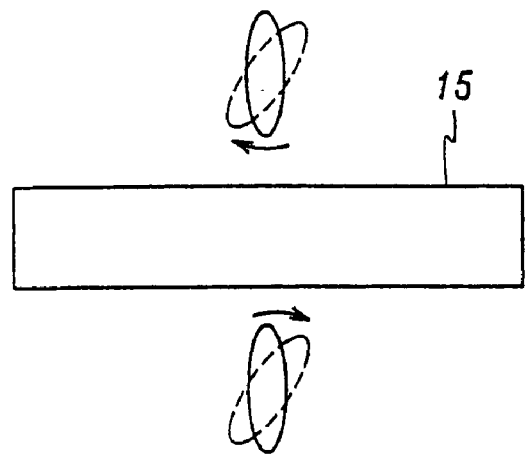

The linear apertures 15 of the ITO electrode 4 extends vertically in FIG. 13A, while the linear apertures 15 of the ITO electrode 4 extends horizontally in FIG. 13B.

Here, the liquid crystal molecules are left-handed when viewed from the bottom of the drawing sheet.

When the voltage is applied to the electrodes 4 and 5, the liquid crystal molecules tilt in the directions perpendicular to the direction of the electric field due to the voltage difference between the electrodes 4 and 5, as shown in FIG. 2. In addition, as shown in FIGS. 13A and 13B, the liquid crystal molecules rotate clockwise in xy plane.

The tilt directions of the liquid crystal molecules vary according to the extending directions of the apertures. Since the tilt directions of the molecules opposite each other with respect to an aperture are opposite, and there are two extending directions of the apertures, the number of the tilt direction is about four on the Y axis in upper part twist to the right to the X axis, and those on the Y axis in lower part twist to the left to X axis due to the linear aperture formed along the Y axis.

Since the liquid crystal molecules tilt and rotate in four different directions, the viewing angles of up, down, left and right directions are equal and the gray inversion does not occur.

Now, the structures of the color filter and the TFT substrate according to the fifth embodiment are described more fully.

Figure 14:
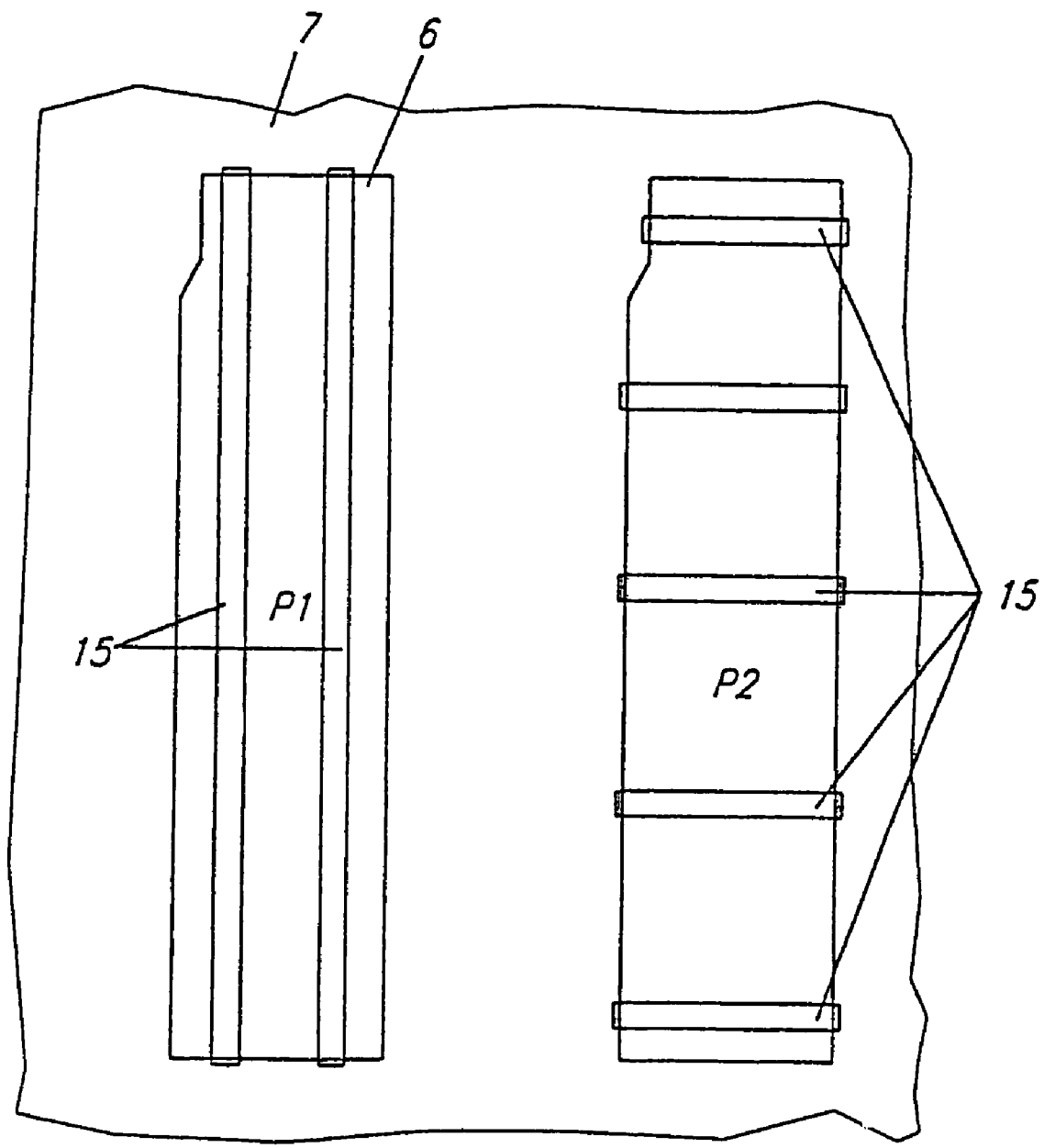
FIG. 14 is a layout view of a common substrate according to the fifth embodiment of the present invention.

FIG. 14 is a layout view of a common substrate showing two adjacent pixels.

As shown in FIG. 14, a black matrix pattern 7 which defines pixel regions P1, P2 is formed on the substrate, and a common electrode 6 formed thereon.

The common electrode 6 has two vertical linear apertures 15 parallel to each other in the first pixel region P1, and has a plurality of horizontal linear apertures 15 parallel to each other in the second pixel region P2 adjacent to the first pixel region P1.

The width and the distance of the apertures may be the same as those of the first embodiment.

Figure 15:
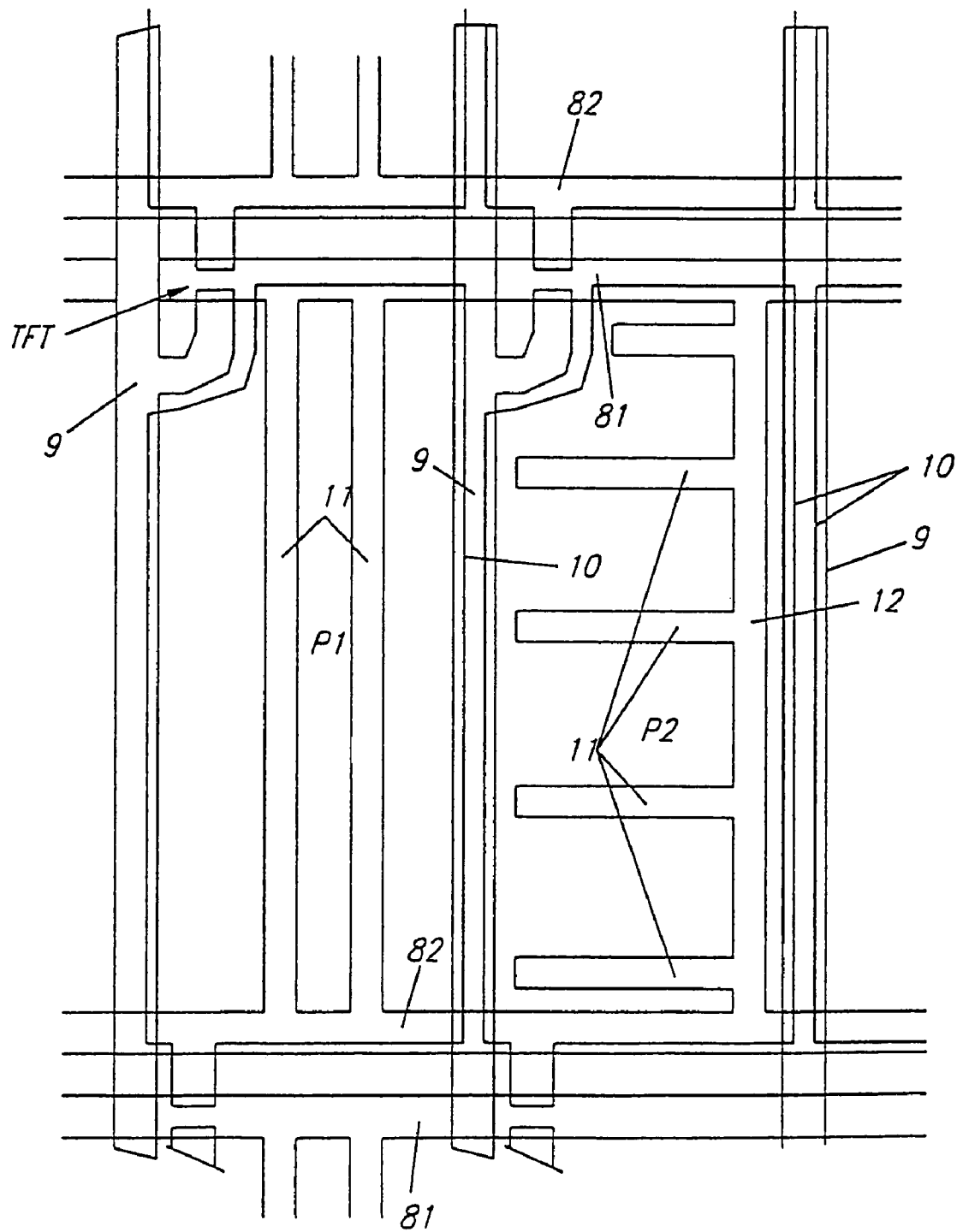
FIG. 15 is a layout view of a TFT substrate according to the fifth embodiment of the present invention.

FIG. 15 is a layout view of a TFT substrate according to the fifth embodiment of the present invention. In a pixel region P1 corresponding to the pixel region P1 on the common substrate in FIG. 14, a first and a second gate lines 81 and 82 and two vertical storage capacitor electrodes 11 parallel to each other and connecting the gate lines 81 and 82 are formed as those in FIG. 4. In a pixel region P2, a branch 12 connecting two gate lines 81 and 82 extends parallel to a data line 9, and a plurality of storage capacitor electrodes 11 extend parallel to the gate lines 81 and 82 from the branch 12.

As all the above-described embodiments, the storage capacitor electrodes 11 are located at the positions corresponding to the apertures 15 in the common electrode 6.

The storage capacitor electrodes 11 overlaps a pixel electrode 10 to form storage capacitors, and play a role of a black matrix to prevent the light leakage caused by the disclination due to the apertures 15 in common electrode 6.

The apertures in adjacent pixel regions may have various shapes. FIGS. 16–19 are layout views of the sixth to the ninth embodiments having variously shaped apertures in adjacent pixel regions.

Figure 16:
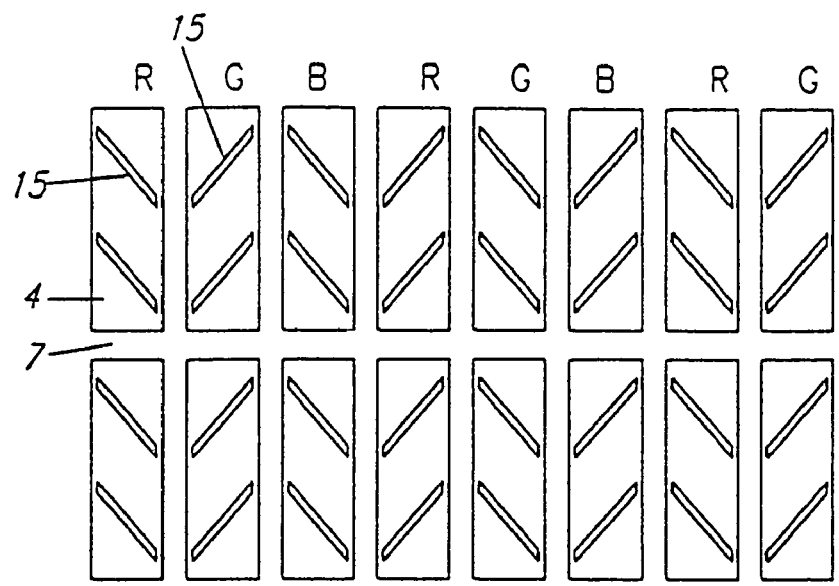
FIG. 16–19 are layout views of substrates according to the sixth to the ninth embodiments of the present invention.
Figure 17:
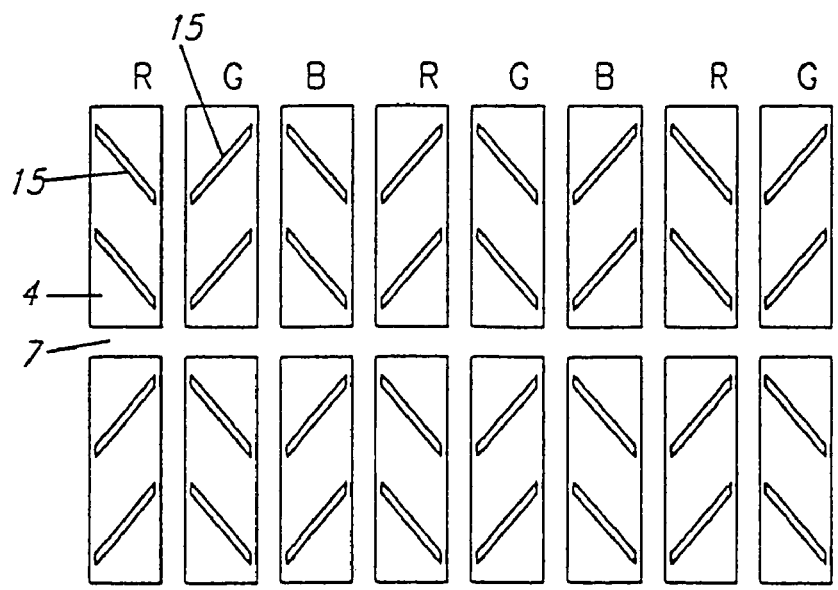

An LCD according to the sixth embodiment shown in FIG. 16 has first pixels having apertures shown in FIG. 10 and second pixels having apertures of shapes which is the same as the apertures in the first pixels rotated by 180° with respect to the central point of the pixel. In horizontal direction, two kinds of pixels are arranged alternately, and in vertical direction, pixels in a column are the same kind. As a whole, the apertures form a chevron shape in the sixth embodiment. An LCD according to the seventh embodiment shown in FIG. 17 has the same arrangement in the horizontal direction, however, in the vertical direction, two kinds of pixels are arranged alternately as in the horizontal direction. In the seventh embodiment, the apertures form a chevron shape in a row, but when viewing adjacent rows, the apertures form X or diamond shapes.

Figure 18:
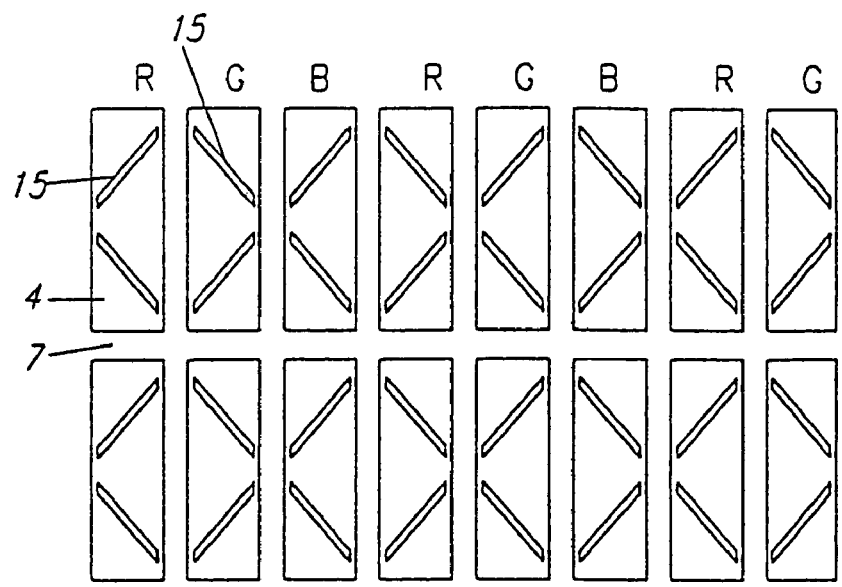
Figure 19:
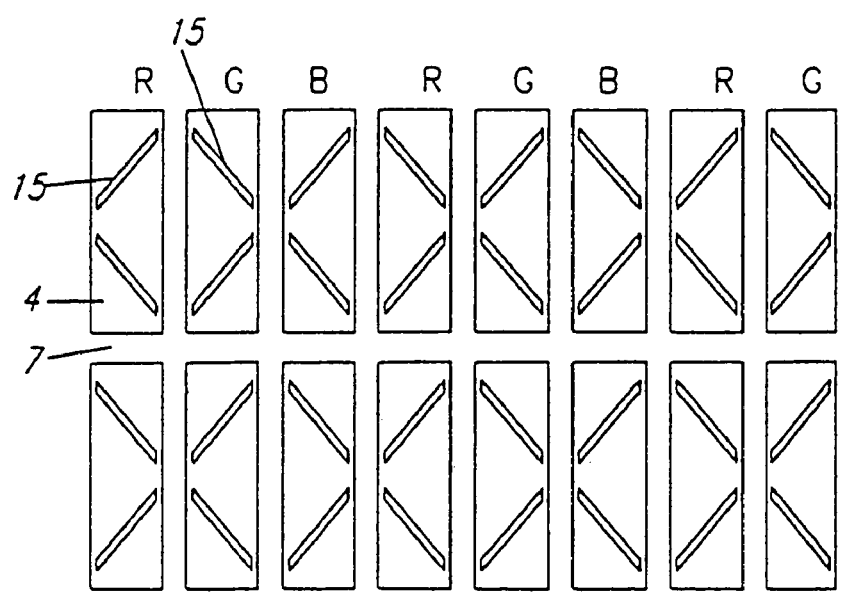

An LCD according to the eighth embodiment shown in FIG. 18 has first pixels having apertures shown in FIG. 8 and the second pixels having apertures of shapes which is the same as the apertures in the first pixels rotated by 180° with respect to the central point of the pixel. In horizontal direction, two kinds of pixels are arranged alternately, and in vertical direction, pixels in a column are the same kind. As a whole, the apertures form an X or diamond shape. An LCD according to the ninth embodiment shown in FIG. 19 has the same arrangement in the horizontal direction, however, in the vertical direction, two kinds of pixels are arranged alternately as in the horizontal direction. In the ninth embodiment, the apertures form an X or diamond shape in a row.

According to the embodiments of the present invention, column shaped spacers made of metal or organic material may be used instead of ball shaped spacers since the ball shaped spacers may cause light leakage due to the disturbance of the liquid crystal molecules near the spacers.

Figure 20:
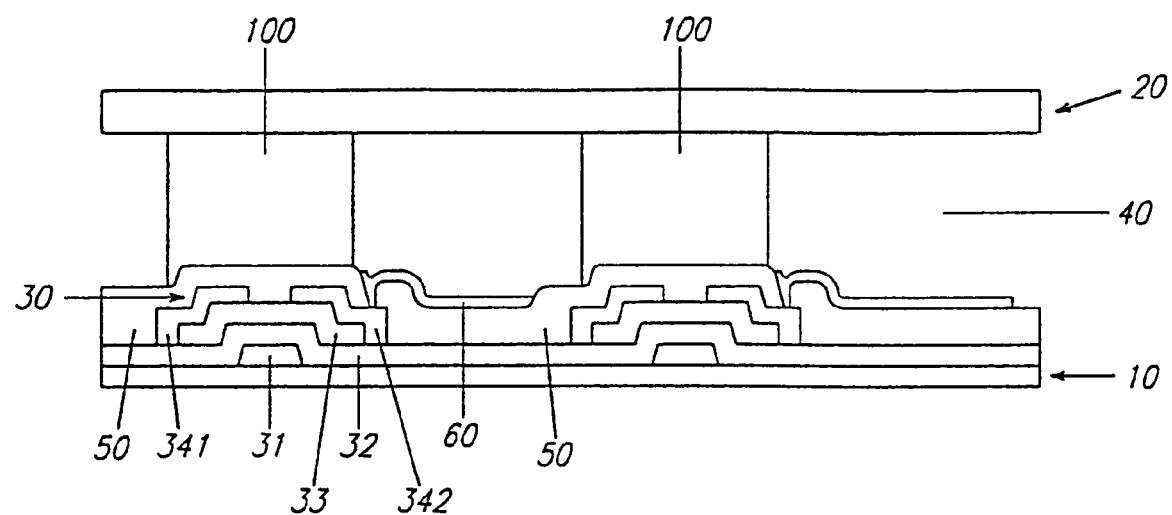
FIG. 20 is a sectional view of LCD according to an embodiment of the present invention.

FIG. 20 shows a sectional view of an LCD having spacers according to an embodiment of the present invention. A liquid crystal layer 40 is interposed between a substrate 10 having a TFT 30 and a substrate 20 having a color filter (not shown). The TFT 30 formed on the lower substrate 10 includes a gate electrode 31, a gate insulating layer 32 formed thereon, a semiconductor layer 33 formed on a portion of the gate insulating layer 32 over the gate electrode 31, source/drain electrodes 341, 342 formed on the semiconductor layer 33. A passivation layer 50 covers the entire surface of the substrate 10 having the TFT 30. A pixel electrode 60 is formed in the pixel region and electrically connected to the drain electrode 342 through a contact hole in the passivation layer 50. A spacer 100 made of a metal or an organic material is formed on the TFT.

In the embodiments of the present invention, the apertures are formed in the common electrode 6, however, the apertures can be formed in the pixel electrode 10. When the apertures are formed in the pixel electrode 10, the fringe field generated between the pixel electrode 10 and the common electrode 6 may be affected by the voltages applied to the data line 9 the gate lines 81 and 82 and the storage capacitor electrode 11. To remove the influence due to the voltage applied to those signal lines, it is preferable that the thickness of the passivation layer 50 is equal to or more than 3 $\mu$m by using organic insulating material.

In the embodiments of the present invention, although the storage capacitor electrodes 11 are connected to the gate lines 81 and 82, the storage capacitor electrodes 11 may be connected to another signal sources.

According to the embodiments of the present invention, the liquid crystal molecules are tilted in the various directions due to the fringe field to have a wide viewing angle, and the storage capacitor electrodes prevents the light leakage near the fringe field.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A liquid crystal display, comprising:
   a first substrate;
   a second substrate, spaced apart from the first substrate;
   a first adjacent pixel region on the first substrate;
   a second adjacent pixel region on the second substrate; and
   first and second field-generating electrodes on the first and second adjacent pixel regions, respectively, the first field-generating electrode having a first aperture and a second aperture and the second field-generating electrode having a third aperture and a fourth aperture, an orientation of at least one of the first and second apertures of the first field-generating electrode being different from an orientation of at least one of the third and fourth apertures of the second field-generating electrode;
   wherein the one of the first and second substrates comprising the first and second pixel regions comprises a plurality of data lines and a plurality of gate lines that define the first and second pixel regions, wherein orientations of the first and second apertures in the first field-generating electrode are parallel to the plurality of data lines or wherein orientations of the third and fourth apertures of the second field-generating electrode are perpendicular to the plurality of data lines.

2. A liquid crystal display, comprising:
   a first substrate;
   a second substrate, spaced apart from the first substrate;
   a first adjacent pixel region on the first substrate;
   a second adjacent pixel region on the second substrate; and first and second field-generating electrodes on the first and second adjacent pixel regions, respectively, the first field-generating electrode having a first aperture and a second aperture and the second field-generating electrode having a third aperture and a fourth aperture, an orientation of at least one of the first and second apertures of the first field-generating electrode being different from an orientation of at least one of the third and fourth apertures of the second field-generating electrode;

wherein the first and second apertures extend downward at angle from a left side of the first field-generating electrode and wherein the third and fourth apertures extend downward at angle from a right side of the second field-generating electrode.

3. The liquid crystal display of claim 2, wherein the angle between the left side of the first field-generating electrode and an under side of the first aperture and an under side of the second aperture is from about 30 to about 50 degrees and wherein the angle between the right side of the second field-generating electrode and an under side of the third aperture and an under side of the fourth aperture is from about 30 to about 50 degrees.

4. A liquid crystal display, comprising:

a first substrate;

a second substrate, spaced apart from the first substrate;

a first adjacent pixel region on the first substrate;

a second adjacent pixel region on the second substrate; and first and second field-generating electrodes on the first and second adjacent pixel regions, respectively, the first field-generating electrode having a first aperture and a second aperture and the second field-generating electrode having a third aperture and a fourth aperture, an orientation of at least one of the first and second apertures of the first field-generating electrode being different from an orientation of at least one of the third and fourth apertures of the second field-generating electrode;

wherein the first and third apertures extend downward at angle from a left side of the first field-generating electrode and wherein the second and fourth apertures extend downward at angle from a right side of the second field-generating electrode.

5. The liquid crystal display of claim 4, wherein the angle between the left side of the first field-generating electrode and an under side of the first aperture and an under side of the third aperture is from about 120 to about 150 degrees and wherein the angle between the right side of the second field-generating electrode and an under side of the second aperture and an under side of the fourth aperture is from about 120 to about 150 degrees.

6. A liquid crystal display, comprising:

a first substrate;

a second substrate, spaced apart from the first substrate;

a first adjacent pixel region on the first substrate;

a second adjacent pixel region on the second substrate; and first and second field-generating electrodes on the first and second adjacent pixel regions, respectively, the first field-generating electrode having a first aperture and a second aperture and the second field-generating electrode having a third aperture and a fourth aperture, an orientation of at least one of the first and second apertures of the first field-generating electrode being different from an orientation of at least one of the third and fourth apertures of the second field-generating electrode;

wherein a distance between the first aperture and the second aperture is from about 8 $\mu$m to about 50 $\mu$m and wherein a distance between the third aperture and the fourth aperture is from about 8 $\mu$m to about 50 $\mu$m.

* * * * *